US012580902B2

(12) United States Patent
Sahu et al.

(10) Patent No.: US 12,580,902 B2
(45) Date of Patent: Mar. 17, 2026

(54) ASSOCIATING PROBE TO A FUNCTION IN AN ENCRYPTED CONNECTION INITIATED BY THE FUNCTION

(71) Applicant: Harness Inc., San Francisco, CA (US)

(72) Inventors: Santosh Sahu, Karnataka (IN); Puneet Agarwal, Bangalore (IN); Sanjay Nagraj, Dublin, CA (US)

(73) Assignee: Harness Inc, San Francisco, CA (US)

( * ) Notice: Subject to any disclaimer, the term of this patent is extended or adjusted under 35 U.S.C. 154(b) by 77 days.

(21) Appl. No.: 18/582,705

(22) Filed: Feb. 21, 2024

(65) Prior Publication Data

US 2025/0267131 A1 Aug. 21, 2025

(51) Int. Cl.
H04L 29/06 (2006.01)
H04L 9/40 (2022.01)

(52) U.S. Cl.
CPC ...... H04L 63/0435 (2013.01); H04L 63/1425 (2013.01); H04L 63/20 (2013.01)

(58) Field of Classification Search
CPC ............. H04L 63/0435; H04L 63/0428; H04L 63/184; H04L 63/1425; H04L 63/20; G06F 21/602; G06F 21/16
See application file for complete search history.

(56) References Cited

U.S. PATENT DOCUMENTS

2019/0028496 A1* 1/2019 Fenoglio ............. H04L 63/1425
2022/0147542 A1* 5/2022 Asgar ................... G06F 11/323
2023/0090689 A1* 3/2023 Knierim .................. G06F 21/53
2024/0275816 A1* 8/2024 Guo ...................... H04L 63/166

* cited by examiner

*Primary Examiner* — Yogesh Paliwal

(57) ABSTRACT

A method for associating probe to function in an encrypted connection initiated by the function is disclosed. The method includes receiving data pertaining to an encrypted connection initiated by a function compliant to a secure communication protocol. Next, the method includes identifying a pointer of a structure holding details associated with the initiated encrypted connection. Thereafter, the method includes associating a probe to the function based on the pointer to trace, track, and monitor the function.

20 Claims, 7 Drawing Sheets

200

| SYSTEM |
| 102 |

| ONE OR MORE PROCESSORS | I/O INTERFACE |
| 202 | 204 |

ONE OR MORE MODULES
206

| RECEIVER MODULE | POINTER IDENTIFICATION MODULE |
| 210 | 212 |

| PROBE ASSOCIATION MODULE | SECURITY BREACH ANALYSIS MODULE |
| 214 | 216 |

OTHER MODULE
218

DATA STORAGE UNIT
208

| POINTER DETAILS | STRUCTURE HOLDING DETAILS |
| 220 | 222 |

OTHER DATA
224

PROBE
__104__

```
#INCLUDE <LINUX/BPF.H>
#INCLUDE <LINUX/VERSION.H>
#INCLUDE <LINUX/PTRACE.H>
#INCLUDE <LINUX/SCHED.H>
#INCLUDE <LINUX/TYPES.H>
#INCLUDE <LINUX/UNISTD.H>
SEC("KPROBE/<FUNCTION_NAME>")
INT KPROBE_FUNCTION(STRUCT PT_REGS *CTX) {
    // THIS CODE RUNS WHEN THE SPECIFIED KERNEL FUNCTION IS INVOKED
    // ACCESSING FUNCTION ARGUMENTS USING BPF HELPER MACROS
    U32 ARG0 = (U32)PT_REGS_PARM1(CTX);
    U32 ARG1 = (U32)PT_REGS_PARM2(CTX);
    // PERFORM ACTIONS BASED ON THE FUNCTION BEHAVIOR
    // (E.G., LOGGING, MONITORING, ANALYZING PARAMETERS, ETC.)
    RETURN 0;
}
CHAR _LICENSE[] SEC("LICENSE") = "GPL";
```

FIG. 3

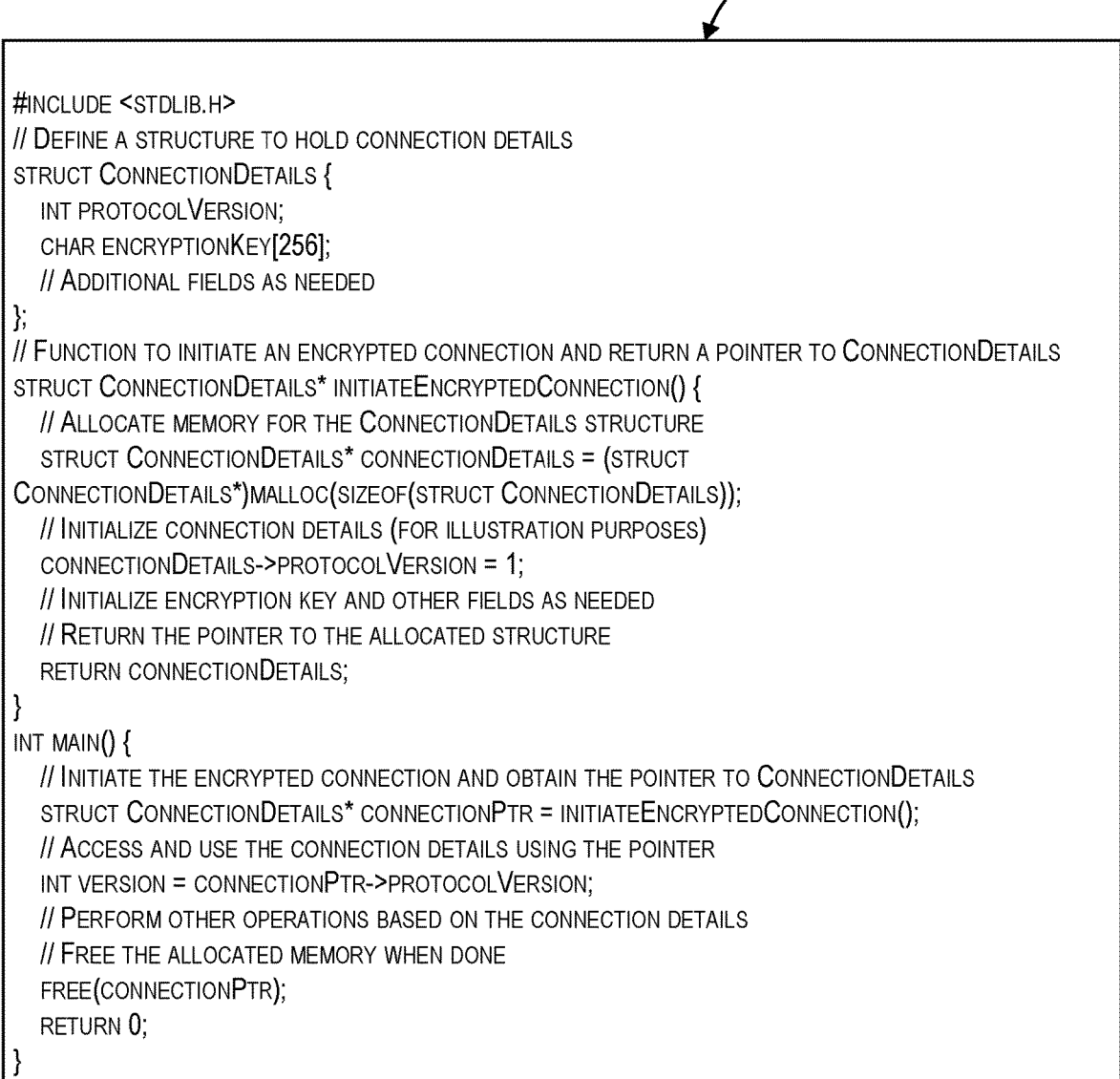

```
#INCLUDE <STDLIB.H>
// DEFINE A STRUCTURE TO HOLD CONNECTION DETAILS
STRUCT CONNECTIONDETAILS {
    INT PROTOCOLVERSION;
    CHAR ENCRYPTIONKEY[256];
    // ADDITIONAL FIELDS AS NEEDED
};
// FUNCTION TO INITIATE AN ENCRYPTED CONNECTION AND RETURN A POINTER TO CONNECTIONDETAILS
STRUCT CONNECTIONDETAILS* INITIATEENCRYPTEDCONNECTION() {
    // ALLOCATE MEMORY FOR THE CONNECTIONDETAILS STRUCTURE
    STRUCT CONNECTIONDETAILS* CONNECTIONDETAILS = (STRUCT
CONNECTIONDETAILS*)MALLOC(SIZEOF(STRUCT CONNECTIONDETAILS));
    // INITIALIZE CONNECTION DETAILS (FOR ILLUSTRATION PURPOSES)
    CONNECTIONDETAILS->PROTOCOLVERSION = 1;
    // INITIALIZE ENCRYPTION KEY AND OTHER FIELDS AS NEEDED
    // RETURN THE POINTER TO THE ALLOCATED STRUCTURE
    RETURN CONNECTIONDETAILS;
}
INT MAIN() {
    // INITIATE THE ENCRYPTED CONNECTION AND OBTAIN THE POINTER TO CONNECTIONDETAILS
    STRUCT CONNECTIONDETAILS* CONNECTIONPTR = INITIATEENCRYPTEDCONNECTION();
    // ACCESS AND USE THE CONNECTION DETAILS USING THE POINTER
    INT VERSION = CONNECTIONPTR->PROTOCOLVERSION;
    // PERFORM OTHER OPERATIONS BASED ON THE CONNECTION DETAILS
    // FREE THE ALLOCATED MEMORY WHEN DONE
    FREE(CONNECTIONPTR);
    RETURN 0;
}
```

ASSOCIATING PROBE TO A FUNCTION IN AN ENCRYPTED CONNECTION INITIATED BY THE FUNCTION

BACKGROUND

Technical Field

The present disclosure relates to the field of low-level code instrumentation and analysis, and particularly relates to a system and method for tracing, tracking, and monitoring the encrypted Application Programming Interface (API) calls.

Description of the Related Art

Modern computing systems, particularly those based on the Linux operating system, rely on intricate software structures to function efficiently. Critical components of the system, such as kernel functions and user space functions, are integral to the seamless operation of applications. For detecting and preventing security threads in Application programming Interface (API) calls, probes are associated with these kernel and user functions. Custom programs, such as probes, are used to get access to such function's argument through registers that may be accessed through an open-source library. For tracing and tracking API calls during the invocation of the kernel functions or the user space functions, programs, such as through extended Berkeley Packet Filter (eBPF) technology, referred to as probes, are utilized that help in debugging the kernel functions and the user space functions. It may be noted that the probes that are hooked to the kernel functions are called kprobe, and the probes hooked to the user space functions are called uprobe. Accordingly, such probes are also utilized to capture application data by hooking into functions, allowing users to inspect and manipulate data flowing through the functions. For example, plaintext HTTP data can be captured by hooking into read and write kernel functions. Typically, such hooking is performed based on details such as process ID and file descriptor associated with the function.

Typically, a memory address is mapped by a structure to determine the file descriptor that may be used for hooking the probe to the function but determining the file descriptor is challenging when there is any application change and/or operating system versions changes in the system. In addition to this challenge, when the connection is an encrypted connection, such as a TLS connection, then the data exchanged is encrypted binary data. When the API calls are made through an encrypted connection, monitoring the life cycles of the encrypted connection and tracking the API call initiated by an application or program becomes difficult. Due to the data being encrypted binary data, specific details of application-layer information including the process ID, the file descriptor, or any other higher-level protocol details are not directly visible to external observers or networking monitoring tools. As a result, such data is hidden, and hooking the probes onto the function becomes more challenging, thus making tracing, tracking, and monitoring the functions more difficult in the encrypted connections.

Therefore, there is a need for a system and method for tracing, tracking, and monitoring the functions independent of the file descriptor determination and/or visibility, such as during encrypted connections to overcome the above-mentioned drawbacks.

BRIEF SUMMARY

One or more embodiments are directed to a system, method, and computer program product (together referred to as 'disclosed mechanism') for associating probe to a function in an encrypted connection initiated by the function. The disclosed mechanism provides a solution to the challenges posed by encrypted connections, offering a systematic approach to tracing, tracking, and monitoring functions within such environments. A combination of a receiver module, a pointer identification module, and a probe association module, along with a security breach analysis module, forms a comprehensive system that contributes to efficient low-level code instrumentation and analysis in complex computing systems. In operation, the system utilizes the combination of the receiver, the pointer identification module, and the probe association module to monitor encrypted connections initiated by functions. Further, the system employs a probe that is associated with these functions based on their pointers to trace, track, and monitor the behavior of API calls associated with these functions throughout the lifecycle of the encrypted connection. The association of probe based on the pointer allows operating system version independence of the system and corresponding tracing, tracking, and monitoring allows security breach analysis in the encrypted connection.

An embodiment of the present disclosure relates to the system for associating probe to a function in an encrypted connection initiated by the function. In an embodiment, the system includes a receiver module to receive data pertaining to an encrypted connection initiated by a function. The encrypted connection is compliant to a secure communication protocol, such as Transfer Layer Security (TLS) and Secure Socket Layer (SSL). Further, the system includes a pointer identification module to identify a pointer of a structure holding details associated with the initiated encrypted connection. Such pointer is created during the initialization of the encrypted connection by the function. Furthermore, the system includes a probe association module to associate a probe to the function based on the pointer to trace, track, and monitor the function. Since the probe is associated based on the pointer, the association of the probe with the function is irrespective of operating system version of a corresponding network asset. The probe may correspond to an extended Berkeley packet Filter (eBPF) program and includes an eBPF uprobe and/or an eBPF kprobe. Such probe monitors events, associated with the pointer, across lifecycle of the encrypted connection for the tracing, tracking, and monitoring of the function. Further, the system includes a security breach analysis module to create a behavior fingerprint of the function to determine a normal and an abnormal traffic behavior in the encrypted connection based on the monitored events.

An embodiment of the present disclosure relates to the method for associating probe to a function in an encrypted connection initiated by the function. In an embodiment, the method includes the steps of receiving data pertaining to an encrypted connection initiated by a function compliant to a secure communication protocol. In an embodiment, the method includes the steps of identifying a pointer of a structure holding details associated with the initiated encrypted connection. Such pointer is created during the initialization of the encrypted connection by the function. In an embodiment, the method includes the steps of associating a probe to the function based on the pointer to trace, track, and monitor the function. Since the probe is associated based on the pointer, the association of the probe with the function is irrespective of operating system version of a corresponding network asset. Such probe monitors events, associated with the pointer, across lifecycle of the encrypted connection for the tracing, tracking, and monitoring of the function. In an embodiment, the method includes the steps of creating a behavior fingerprint of the function to determine a normal and an abnormal traffic behavior in the encrypted connection based on the monitored events.

An embodiment of the present disclosure relates to the computer program product including at least one non-transitory computer-readable storage medium having computer-executable program code portions stored therein. The computer program product is configured to receive data pertaining to an encrypted connection initiated by a function compliant to a secure communication protocol. Further, the computer program product is configured to identify a pointer of a structure holding details associated with the initiated encrypted connection. Such pointer is created during the initialization of the encrypted connection by the function. Furthermore, the computer program product is configured to associate a probe to the function based on the pointer to trace, track, and monitor the function. Since the probe is associated based on the pointer, the association of the probe with the function is irrespective of operating system version of a corresponding network asset. Such probe monitors events, associated with the pointer, across lifecycle of the encrypted connection for the tracing, tracking, and monitoring of the function. Additionally, the computer program product is configured to create a behavior fingerprint of the function to determine a normal and an abnormal traffic behavior in the encrypted connection based on the monitored events.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates an exemplary probe, in accordance with an embodiment of the present disclosure.

FIG. 4 illustrates an exemplary program showing creation and utilization of the pointer, in accordance with an embodiment of the present disclosure.

Figure 1:
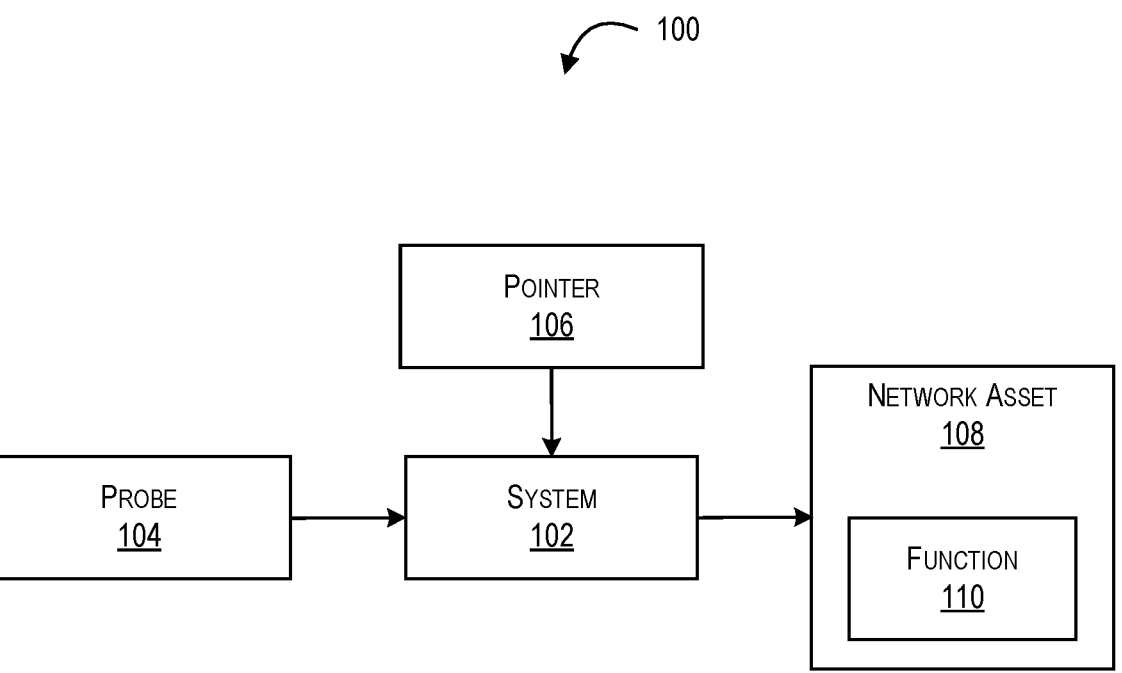
FIG. 1 illustrates an exemplary environment having a network asset connected to a system for associating probe to a function in an encrypted connection initiated by the function, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system, method, and computer program product (together referred to as 'disclosed mechanism') for associating probe to a function in an encrypted connection initiated by the function. The disclosed mechanism provides a solution to the challenges posed by encrypted connections, offering a systematic approach to tracing, tracking, and monitoring functions within such environments. The combination of a receiver module, a pointer identification module, and a probe association module, along with a security breach analysis module, forms a comprehensive system that contributes to efficient low-level code instrumentation and analysis in complex computing systems. In operation, the system utilizes the combination of the receiver, the pointer identification module, and the probe association module to monitor encrypted connections initiated by functions. Further, the system employs a probe that is associated with these functions based on their pointers to trace, track, and monitor the behavior of these functions throughout the lifecycle of the encrypted connection. The association of probe based on the pointer allows operating system version independence of the system and corresponding tracing, tracking, and monitoring allows security breach analysis in the encrypted connection.

FIG. 1 illustrates an exemplary environment 100 having a network asset 108 connected to a system 102 for associating a probe 104 to a function 110 in an encrypted connection initiated by the function 110, in accordance with an embodiment of the present disclosure. In a non-limiting embodiment, an operating system associated with the network asset 108 may be a Linux operating system and the probe 104 may be an extended Berkeley Packet Filter (eBPF) program. Further, the functions 110 may, without any limitation, correspond to a kernel function and a user space function. In an embodiment, the user functions are associated with a user space i.e. a part of memory where regular applications and software run. For example, web browsers, word processors, games, and other software applications that operate in the user space. Such functions perform tasks that the users directly interact with, like browsing the internet, typing documents, and playing games. The probe 104 attached to the function 110 within the user space to trace and monitor its activities is called uprobes. Such tracing and monitoring allows debugging, profiling, and performance analysis of the user functions. In an embodiment, the kernel functions are associated with a kernel space i.e., a protected part of memory where the core functions of the operating system, including the device drivers and low-level system processes, reside. Typically, when the user functions need to perform a task that requires access to hardware or sensitive system resources, it requests the kernel to perform that task on its behalf. For example, when a user space function wants to read data from a hard disk, then it requests the kernel to handle the disk I/O operations. The probe 104 attached to the function 110 within the kernel space to trace and monitor its activities is called kprobes. Such tracing and monitoring allows tracing and analyze low-level system behavior. In a non-limiting example, when dealing with binaries that utilize Transport Layer Security (TLS) libraries such as OpenSSL, the uprobe may be attached to critical functions like SSL_read and/or SSL_write that handle plaintext data which makes them crucial for security monitoring.

In an embodiment, the function 110 may, without any limitation, include a non-wrapped function and a wrapped function. The non-wrapped function may correspond to a legacy system call or kernel function whose usage remains consistent across different kernel versions without any additional architectural or version-specific wrapping. Accordingly, the non-wrapped function typically follows the traditional naming conventions without any architecture-specific prefixes or modifications. For example, a "sys_open" system call in the Linux kernel for representing the operation of opening a file, as shown below:

```
#include <Linux/fs.h>
asmlinkage long sys_open(const char _user*filename, int
    flags, umode_t mode);
```

The wrapped function may correspond to a system call or kernel function that has been modified or "wrapped" with architecture-specific or version-specific prefixes or alterations to accommodate changes in naming conventions or to provide compatibility with different architectures or versions of the operating system. Such wrapping allows the kernel to handle architecture-specific implementations while providing a standardized interface for system calls. The use of wrapped functions is common in modern kernels to support diverse architectures and maintain compatibility across different versions. Typically, in newer versions of the kernel, especially those that support 64-bit x86 architectures, system calls like "sys_open" are often wrapped with architecture-specific identifiers. For example: a "_x64_sys_open" system call in the Linux kernel representing the operation of opening a file, as shown below:

```
#include <Linux/fs.h>
asmlinkage        long        _x64_sys_open(const
    char_user*filename, int flags, umode_t mode);
```

In an embodiment, the system 102 may be connected to the network asset 108 via a network. The network (such as a communication network) may include, without limitation, a direct interconnection, a Local Area Network (LAN), a Wide Area Network (WAN), a wireless network (e.g., using Wireless Application Protocol), the Internet, and the like. Further, the network asset 108 may, without any limitation, include assets, such as routers, switches, hubs, firewalls, printers, hosts, servers, and wireless access points having different software configurations in terms of at least Operating System (OS), applications, patches, and updates. It may be apparent to a person skilled in the art that the actual environment may include more than one network assets 108, however, for the sake of brevity, the system 102 is explained in conjunction with one connected network asset 108 in the entirety of the disclosure until and unless specified therein. For tracing and monitoring the functions 110 associated with such assets in the encrypted connection, a user may create a probe 104 that may be attached to a function in the OS of the network asset 108 by determining the file descriptor and/or process ID. However, in the context of encrypted connection, the specific details of application-layer information, such as proceed ID, the file descriptor, and other higher-level protocol details may be hidden. Thus, the system 102 may take an alternate approach of associating the probe 104 to the function 110 based on the pointer 106 that is essentially created during the initialization of the encrypted connection by the function 110.

In operation, the encrypted connection may correspond to a secure communication channel established between two entities, such as the network asset 108 and a server, for secure communication, particularly for sensitive data transmission over networks. Such encrypted connection is typically initiated by the function 110 or a process within the network asset 108 through one or more steps, such as handshake process, key exchange, authentication, and encryption activation. During the initiation of the encrypted connection, firstly memory allocation is performed by allocating memory to store information related to the encrypted connection. This information may, without any limitation, include details about the encrypted connection parameters, cryptographic keys, and other relevant data. Upon allocating memory, a structure, such as a record or object, may be initialized to hold the information about the encrypted connection. This structure may, without any limitation, include fields for items like protocol version, cryptographic keys, session identifiers, and other connection-specific details. Successively, the pointer 106 may be created by obtaining the memory address of the allocated structure and may serve as a reference to the location in memory where the connection information is stored. Thus, subsequent operations and functions related to the encrypted connection utilize the pointer 106 to access and modify the connection information as needed.

Accordingly, each operation associated with the function 110 even in the encrypted connection is performed by including the pointer 106 that holds the structure holding details of the encrypted connection. Therefore, whenever the encrypted connection is initiated by the function 110, the data pertaining to the initiation of the encrypted connection is received by the system 102 which in turn identifies the pointer associated with the initiated encrypted connection. Further, the system 102 associates the probe 106 to the function based on the pointed 106 to monitor the changes made on the memory space associated with the encrypted connection for tracing, tracking, and monitoring the function 110.

Figure 2:
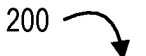
FIG. 2 illustrates a block diagram of the system for associating the probe to the function in the encrypted connection initiated by the function, in accordance with an embodiment of the present disclosure.

FIG. 2 illustrates a block diagram 200 of the system 102 for associating the probe to the function in the encrypted connection initiated by the function, in accordance with an embodiment of the present disclosure.

In an embodiment, the system 102 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 102 with its external environment for facilitating the exchange of information between the system 102 and its users or external devices. Furthermore, the I/O interface 204 may contribute to the user experience by providing intuitive means for input, such as through keyboards or touchscreens, and presenting meaningful output via displays or other output devices.

In an embodiment, the one or more modules 206 may include a receiver module 210, a pointer identification module 212, a probe association module 214, a security breach analysis module 216, and any other module 218 essential or required for the working of the system 102. In an embodiment, the data storage unit 208 may include a pointer details 220, structure holding details 222, and any other data 224 required for the working of the system 102. In an embodiment of the present disclosure, the one or more processors 202 and the data storage unit 208 may form a part of a chipset installed in the system 102. In another embodiment of the present disclosure, the data storage unit 208 may be implemented as a static memory or a dynamic memory. In an example, the data storage unit 208 may be internal to the system 102, such as an onside-based storage. In another example, the data storage unit 208 may be external to the system 102, such as cloud-based storage. Further, the one or more module 206 may be communicatively coupled to the data storage unit 208 and the one or more processor 202 of the system 102. The one or more processors 202 may be configured to control the operations of the one or more module 206.

In an embodiment, the receiver module 210 may receive data pertaining to an encrypted connection initiated by the function 110 compliant to a secure communication protocol. The received data may correspond to an encrypted data having hidden application-layer information with a pointer that points at a memory address having the structure holding details of the encrypted connection. In operation, the receiver module 210 actively listens for incoming data packets and/or communication events by utilizing system-level hooks and/or event interception mechanisms to intercept data related to network communications. As a result, when the function 110 initiates the encrypted connection, the receiver module 210 detects and captures the data corresponding to the initiated encrypted connection. Since the encrypted connection may be compliant to any secure communication protocol, the receiver module 210 may incorporate functionalities to handle various secure communication protocols such as Transfer Layer Security (TLS) and/or Secure Socket Layer (SSL), ensuring its adaptability to different encryption standards. Additionally, the receiver module 210 may also receive the probe 104 (created by the user) to be associated with the function 110 for the purpose of tracing, tracking, and monitoring the function 110.

In an embodiment, the pointer identification module 212 may identify the pointer 106 of the structure holding details associated with the initiated encryption connection. The pointer identification module 212 may operate by analyzing the received data received to identify the pointer 106 pointing at the memory address having the structures holding details of the initiated encrypted connection. In order to analyze the received data, pointer identification module 212 may utilize one or more parsing algorithms to traverse the received data intelligently to search for unique patterns, signatures, and/or markers that may indicate the presence of the pointer 106 within the received data. In an embodiment, such patterns, signatures, and/or markers may be predetermined based on the structure or format of the received data used by the initiating function 110 during the encrypted connection setup. In an embodiment, the pointer identification module 212 may operate across different encryption standards, various data structures, and/or potential variations in the initiation process, such that it can effectively identify pointers regardless of the specific implementation details of the encrypted connection.

In an embodiment, the probe association module 214 may associate the probe 104 to the function based on the pointer 106 to trace, track, and monitor the function 110. Upon identifying the pointer 106, the probe association module 214 establishes a direct link between the probe 104 and the function 110 through the identified pointer 106 to monitor the changes that take place on the memory address storing the structure holding details of the encrypted connection. The monitoring of the memory address associated with the encrypted connection allows the probe 104 to collect valuable information pertaining to the function even in the encrypted connection when the application-layer information is hidden. The valuable information may be associated with the function's arguments and/or behavior and may be collected throughout the encrypted connection lifecycle. Since the probe is associated based on the pointer 106, the probe association module 214 may be adept at adapting to changes in the system 102, ensuring that the probe 104 may be associated and remain associated with the corresponding function 110 regardless of changes in the application, operating system version, or encryption standards. Further, the probe association module 214 may involve a dynamic and adaptable approach since the function 110 may evolve or change due to updates or modifications in the system, such that the probe association module 214 may maintain its effectiveness. The probe association module 214 dynamically adjusts the association between the probe 104 and the function 110, ensuring that the probe 104 may continue to capture relevant data and monitor events associated with the pointer 106 across lifecycle of the encrypted connection for the tracing, tracking, and monitoring of the function 110.

In an embodiment, the security breach analysis module 216 creates a behavior fingerprint of the function 110 to determine a normal or abnormal traffic behavior in the encrypted connection based on the monitored events. In operation, the security breach analysis module 216 may analyze data collected by the probe 104 in real-time during the monitoring of the function 110. Based on the analysis, the security breach analysis module 216 may continuously monitor the behavior of the function 110 throughout the encrypted connection lifecycle to identify discrepancies. The discrepancies may, without any limitation, include unexpected changes in function parameters, deviations from established traffic patterns, or any irregularities in the encrypted communication flow. The security breach analysis module 216 may employ one or more anomaly detection techniques to enhance its ability to discern between normal and abnormal behavior, such as by creating the behavior fingerprint of the function 110 involved in the encrypted connections to compare with a baseline of normal traffic behavior and utilizing this comparison to identify a normal or abnormal traffic behavior in the encrypted connection. Additionally, the security breach analysis module 216 may generate alerts or take predefined actions in response to detected security breaches. This may involve logging incidents, notifying administrators, or triggering automated security protocols to mitigate potential threats. The adaptability of this module is paramount, allowing it to evolve its analysis techniques to address emerging security threats and changes in the encrypted connection environment.

FIG. 3 illustrates an exemplary probe 104, in accordance with an embodiment of the present disclosure. The exemplary probe 104 corresponds to an extended Berkeley Packet Filter (eBPF) program created to trace, track, and monitor a specified kernel function during the initiation of the encrypted connection. The use of eBPF technology enhances the ability to perform low-level code instrumentation and analysis within the Linux kernel, offering a versatile tool for debugging and monitoring functions critical to secure communication protocols.

The exemplary probe 104 defines a kernel function hook using the kprobe mechanism, targeting a function named <function_name>. Further, the exemplary probe 104 is identified within the "kprobe_function" routine and utilizes helper macros to extract essential information from the function's execution context (struct pt_regs*ctx). The macros, such as PT_REGS_PARM1 and PT_REGS_PARM2, allow access to the function's parameters, providing a means to observe and analyze the arguments involved in the initiation of the encrypted connection. Accordingly, the exemplary probe 104 may be associated with kernel functions responsible for handling aspects of initialization of the secure communication. For example, during the establishment of the encrypted connection, the exemplary probe 104 may capture and log relevant details, providing insights into the parameters and behaviors of the involved functions.

FIG. 4 illustrates an exemplary program 400 showing creation and utilization of the pointer 106, in accordance with an embodiment of the present disclosure. The exemplary program 400 relates to a fundamental concept of dynamic memory allocation and pointer usage, in scenarios where structures store dynamic data, such as those encountered during the initiation of the encrypted connections. As illustrated, the exemplary program 400 includes a structure, 'ConnectionDetails', intended to store information about the encrypted connection, such as the protocol version and encryption key. Further, the exemplary program 400 includes a 'initiate EncryptedConnection' function dynamically to allocate memory for an instance of this structure using 'malloc' and initializes its fields with placeholder values, simulating the initiation of the encrypted connection. The function then returns the pointer 106 to the allocated memory, allowing access to the connection details throughout the program. In the main function, the pointer 106 is obtained by calling 'initiate EncryptedConnection'. The exemplary program 400 may subsequently use the pointer 106 to access and manipulate the details of the encrypted connection, such as retrieving the protocol version.

Figure 5:
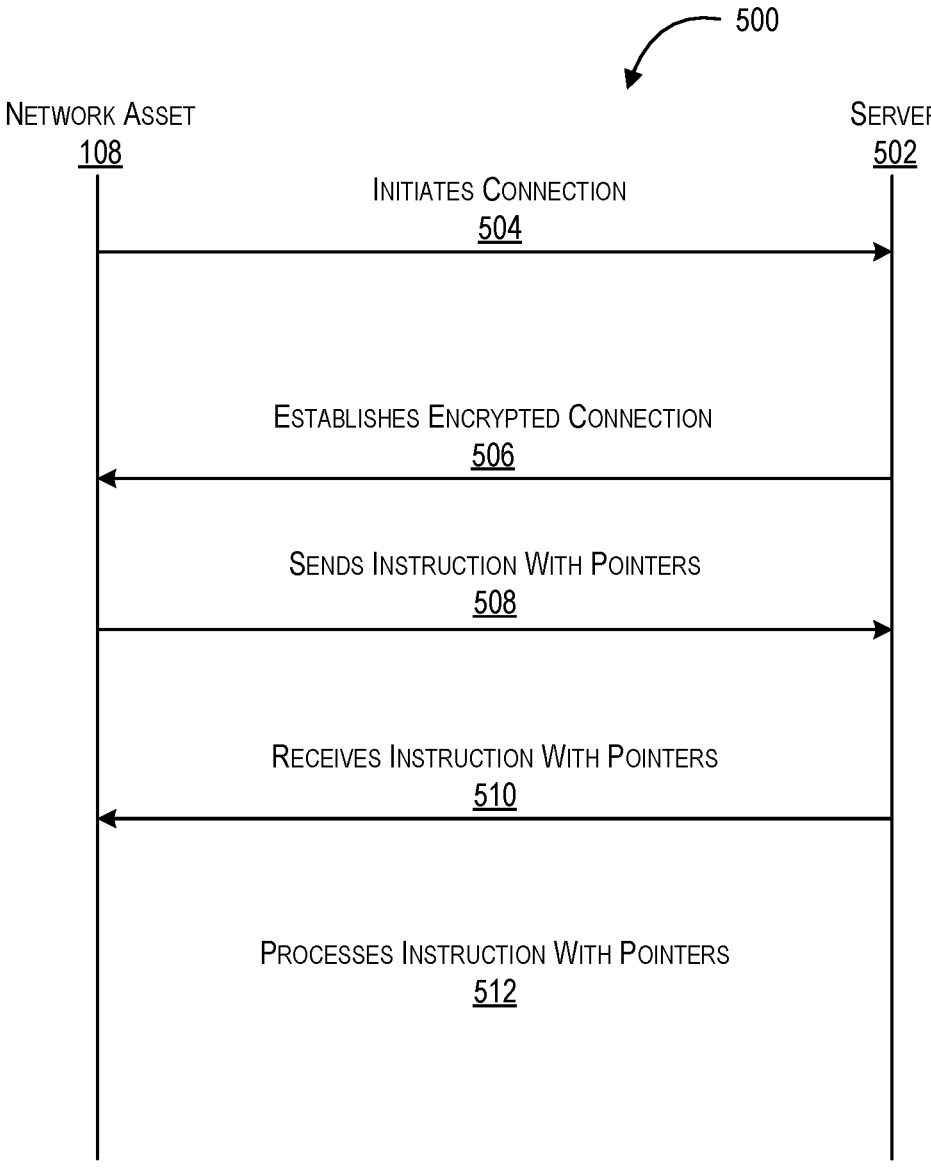
FIG. 5 illustrates a timing diagram associated with transfer of instruction between the network asset and a server, in accordance with an embodiment of the present disclosure.

FIG. 5 illustrates a timing diagram 500 associated with transfer of instruction between the network asset 108 and a server 502, in accordance with an embodiment of the present disclosure. The illustrated timing diagram 500 shows exemplary chronological sequence of events between the network asset 108 and the server 502 during the transfer of instruction containing the pointer 106 in the context of the encrypted connection.

At first, as shown by 504, the network asset 108 may initiate connection by sending a connection request to the server 502. In response, as shown by 506, the server 502 establishes an encrypted connection through a handshake involving the exchange of cryptographic parameters and the establishment of secure communication. Next, as shown by 508, the network asset 108 sends instructions to the server 502. Such instructions include the pointer 106 to data structure relevant to the secure communication in the encrypted connection. Further, the data structure may be accessed and/or modified during execution of every instruction in the encrypted connection. Next, as shown by 510, the server 502 sends an acknowledgement to the network asset 106 confirm the successful receipt of the instructions and accessibility to the data structure pointed by the pointer 106 and/or a new pointer pointing at a memory address associated with the processing of the instruction or the output of them. It may be understood that the probe 104 may be configured to monitor the function 110 using such pointers for tracing, tracking, and monitoring the function 110. Thereafter, as shown by 512, the server 502 may decrypt the instructions using the established encrypted keys and prepare for subsequent processing. Additionally, the server 502 may then execute the instructions by the referencing the pointer 106 to access and manipulate associated data structures. Since the data structure may be modified every time the server 502 performs any task, the probe 104 attached to the function 110 based on the pointer 106 may continuously capture corresponding data to trace, track, and monitor the function.

Figure 6:
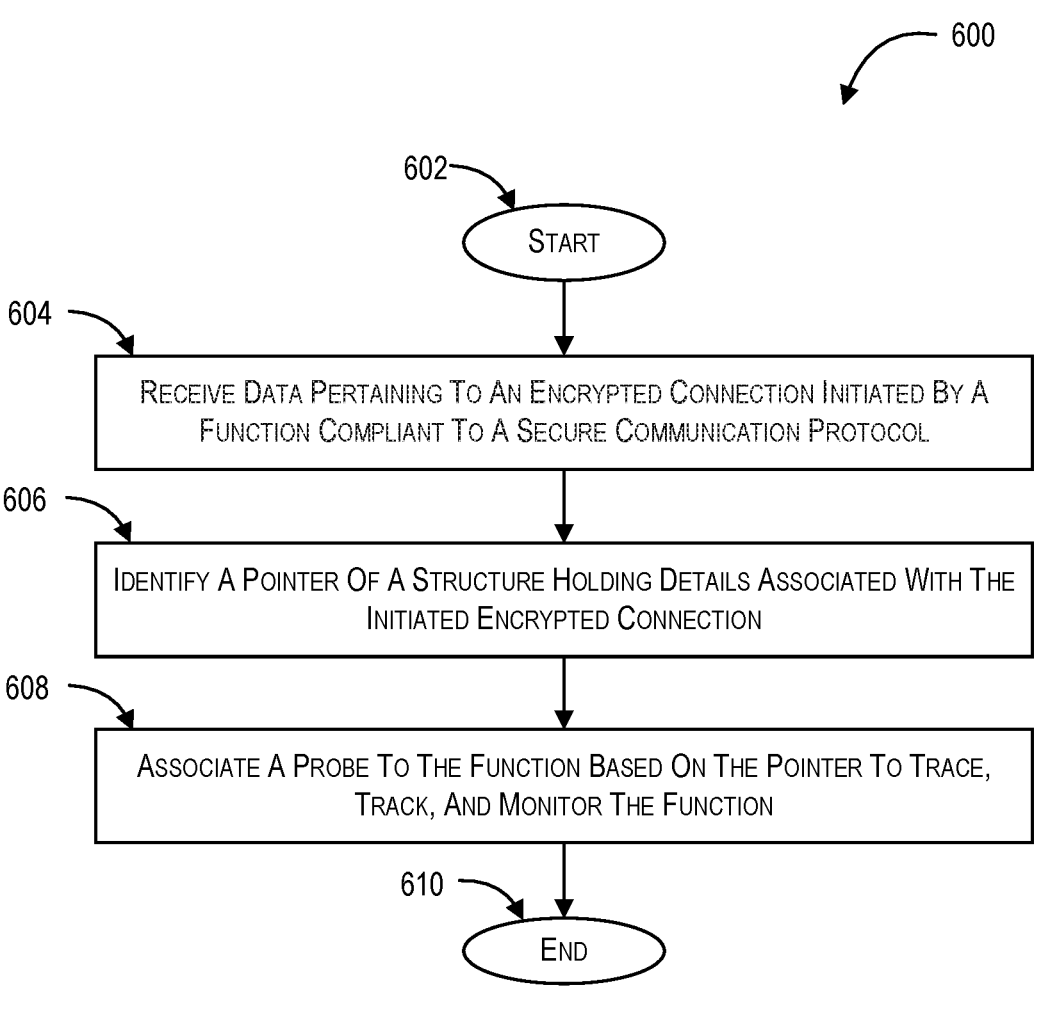
FIG. 6 is a flow chart of a method for associating the probe to the function in the encrypted connection initiated by the function, in accordance with an embodiment of the present disclosure.

FIG. 6 is a flow chart 600 of a method for associating the probe to the function in the encrypted connection initiated by the function, in accordance with an embodiment of the present disclosure. The method starts at step 602.

At first, data pertaining to an encrypted connection that is initiated by a function may be received, at step 604. The encrypted connection may be compliant to a secure communication protocol, such as Transfer Layer Security (TLS) and Secure Socket Layer (SSL).

Next, a pointer of a structure holding details associated with the initiated encrypted connection may be identified, at step 606. Such pointer may be created during the initialization of the encrypted connection by the function.

Next, a probe may be associated to the function based on the pointer to trace, track, and monitor the function, at step 608. Since the probe is associated based on the pointer, the association of the probe with the function is irrespective of operating system version of a corresponding network asset. The probe may correspond to an extended Berkeley Packet Filter (eBPF) program and may, without any limitation, include an eBPF uprobe and an eBPF kprobe. Further, the probe monitors events associated with the pointer, across lifecycle of the encrypted connection for the tracing, tracking, and monitoring of the function. Additionally, the method may include the steps of creating a behavior fingerprint of the function to determine a normal and abnormal traffic behavior in the encrypted connection based on the monitored events. The method ends at step 610.

Figure 7:
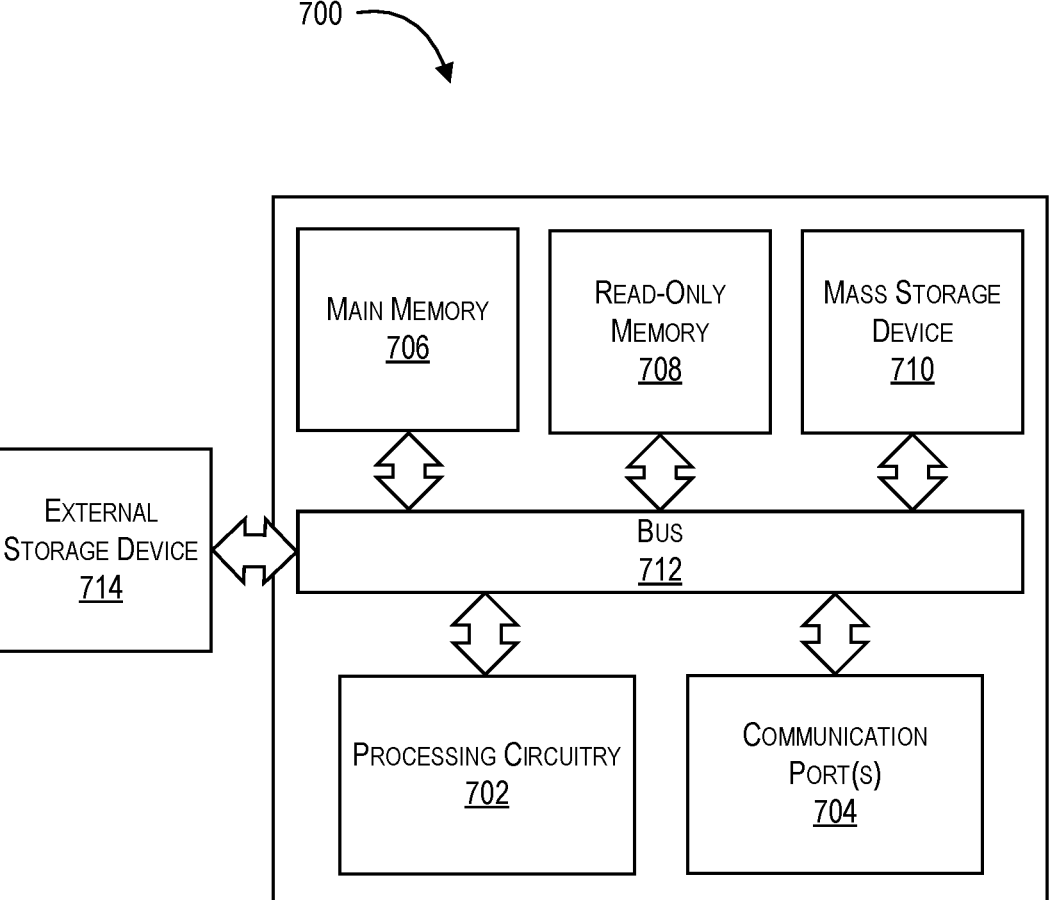
FIG. 7 illustrates an exemplary computer unit in which or with which embodiments of the present disclosure may be utilized.

FIG. 7 illustrates an exemplary computer system in which or with which embodiments of the present disclosure may be utilized. As shown in FIG. 7, a computer system 700 includes an external storage device 714, a bus 712, a main memory 706, a read-only memory 708, a mass storage device 710, a communication port 704, and a processor 702.

Those skilled in the art will appreciate that computer system 700 may include more than one processor 702 and communication ports 704. Examples of processor 702 include, but are not limited to, an Intel® Itanium® or Itanium 2 processor(s), or AMD® Opteron® or Athlon MP® processor(s), Motorola® lines of processors, Forti-SOC™ system on chip processors or other future processors. The processor 702 may include various modules associated with embodiments of the present disclosure.

The communication port 704 can be any of an RS-232 port for use with a modem-based dialup connection, a 10/100 Ethernet port, a Gigabit or 10 Gigabit port using copper or fiber, a serial port, a parallel port, or other existing or future ports. The communication port 704 may be chosen depending on a network, such as a Local Area Network (LAN), Wide Area Network (WAN), or any network to which the computer system connects.

The memory 706 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 702.

The mass storage 710 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 712 communicatively couples processor(s) 702 with the other memory, storage, and communication blocks. The bus 712 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 702 to a software system.

Optionally, operator and administrative interfaces, e.g., a display, keyboard, and a cursor control device, may also be coupled to bus 704 to support direct operator interaction with the computer system. Other operator and administrative interfaces can be provided through network connections connected through communication port 704. An external storage device 710 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the afore-mentioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system comprising:
a receiver module to receive data pertaining to an encrypted connection initiated by a function compliant to a secure communication protocol, wherein the received data is associated with an encrypted data with hidden application layer data with a pointer pointing to an address of a structure holding details associated with the initiated encrypted connection;
a pointer identification module to identify the pointer to the structure holding details associated with the initiated encrypted connection, wherein the structure is allocated during initiation of the encrypted connection, wherein the pointer is created by obtaining the address associated with the structure during initiation of the encrypted connection; and
a probe association module to associate a probe to the function based on the pointer to trace, track, and monitor the function.

2. The system of claim 1, wherein the secure communication protocol includes at least one of: Transfer Layer Security (TLS) and Secure Socket Layer (SSL).

3. The system of claim 1, wherein the pointer is created during the initialization of the encrypted connection by the function.

4. The system of claim 1, wherein the probe corresponds to an extended Berkeley Packet Filter (eBPF) program and includes at least one of: an eBPF uprobe and an eBPF kprobe.

5. The system of claim 1, wherein the probe monitors events, associated with the pointer, across lifecycle of the encrypted connection for the tracing, tracking, and monitoring of the function.

6. The system of claim 1, further comprises a security breach analysis module to create a behavior fingerprint of the function to determine at least one of: a normal and abnormal traffic behavior in the encrypted connection based on the monitored events.

7. The system of claim 1, wherein the probe is associated with the function irrespective of operating system version of a corresponding network asset.

8. A method comprising:
receiving data pertaining to an encrypted connection initiated by a function compliant to a secure communication protocol, wherein the received data is associated with an encrypted data with hidden application layer data with a pointer pointing to an address of a structure holding details associated with the initiated encrypted connection;
identifying the pointer of to the structure holding details associated with the initiated encrypted connection, wherein the structure is allocated during initiation of the encrypted connection, wherein the pointer is created by obtaining the address associated with the structure during initiation of the encrypted connection; and
associating a probe to the function based on the pointer to trace, track, and monitor the function.

9. The method of claim 8, wherein the secure communication protocol includes at least one of: Transfer Layer Security (TLS) and Secure Socket Layer (SSL).

10. The method of claim 8, wherein the pointer is created by the function.

11. The method of claim 8, wherein the probe corresponds to an extended Berkeley Packet Filter (eBPF) program and includes at least one of: an eBPF uprobe and an eBPF kprobe.

12. The method of claim 8, wherein the probe monitors events, associated with the pointer, across lifecycle of the encrypted connection for the tracing, tracking, and monitoring of the function.

13. The method of claim 8, further comprises creating a behavior fingerprint of the function to determine at least one of: a normal and abnormal traffic behavior in the encrypted connection based on the monitored events.

14. The method of claim 8, wherein the probe is associated with the function irrespective of operating system version of a corresponding network asset.

15. A computer program product comprising at least one non-transitory computer-readable storage medium having computer-executable program code portions stored therein, the computer program product configured to:

receive data pertaining to an encrypted connection initiated by a function compliant to a secure communication protocol, wherein the received data is associated with an encrypted data with hidden application layer data with a pointer pointing to an address of a structure holding details associated with the initiated encrypted connection;

identify the pointer to the structure holding details associated with the initiated encrypted connection, wherein the structure is allocated during initiation of the encrypted connection, wherein the pointer is created by obtaining the address associated with the structure during initiation of the encrypted connection; and associate a probe to the function based on the pointer to trace, track, and monitor the function.

16. The computer program product of claim 15, wherein the secure communication protocol includes at least one of: Transfer Layer Security (TLS) and Secure Socket Layer (SSL).

17. The computer program product of claim 15, wherein the pointer is created by the function.

18. The computer program product of claim 15, wherein the probe corresponds to an extended Berkeley Packet Filter (eBPF) program and includes at least one of: an eBPF uprobe and an eBPF kprobe; and wherein the probe monitors events, associated with the pointer, across lifecycle of the encrypted connection for the tracing, tracking, and monitoring of the function.

19. The computer program product of claim 15, further comprises creating a behavior fingerprint of the function to determine at least one of: a normal and abnormal traffic behavior in the encrypted connection based on the monitored events.

20. The computer program product of claim 15, wherein the probe is associated with the function irrespective of operating system version of a corresponding network asset.

* * * * *